United States Patent Office 3,285,578
Patented Nov. 15, 1966

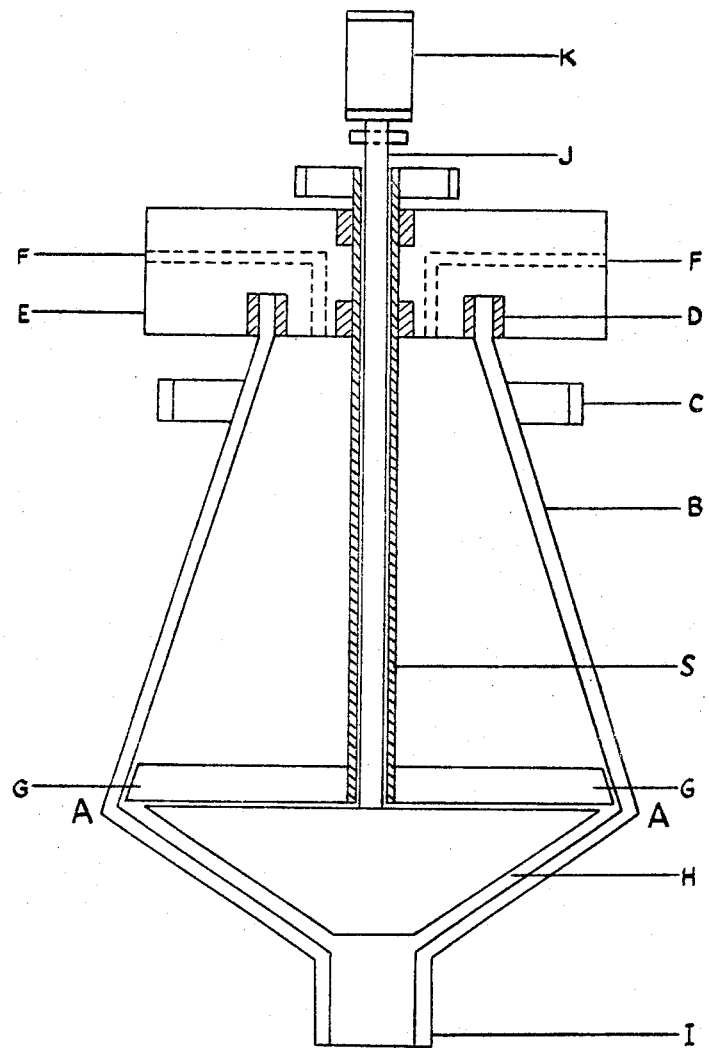

3,285,578
MIXING APPARATUS
Harry Edwards and George Woods, Manchester, England, assignors to Imperial Chemical Industries Limited, London England, a corporation of Great Britain
Filed Feb. 7, 1964, Ser. No. 343,376
Claims priority, application Great Britain, Feb. 8, 1963, 5,267/63
4 Claims. (Cl. 259—3)

This invention relates to a mixing apparatus suitable for mixing ingredients used in the manufacture of polyurethane foams.

It is one of the objects of the present invention to provide an apparatus which will mix polyurethane ingredients and which is enabled to dispense a predetermined quantity of such a mixture, for example for use in moulding.

It is a further object of the invention to provide such a mixing apparatus which is virtually self-cleaning. This is most important in preparing polyurethane foam mixes, as any residues left in the mixer rapidly harden and then present a difficult cleaning problem.

According to the present invention we provide a mixing apparatus suitable for mixing the ingredients used during manufacture of polyurethane foam comprising a rotatable mixing chamber having a plurality of inlets and a closable outlet fed from the internal preiphery of the chamber.

It is preferred that the chamber should contain baffles to improve the rate of mixing. These baffles can, if desired, be adapted to remain stationary or to counter-rotate during rotation of the mixing chamber. A further preference lies in having the mixing chamber in the shape of a truncated cone, the outlet being fed from the base, i.e. the widest diameter, of the cone. The mixing apparatus could, for example, take the form of a mixing chamber capable of being mechanically rotated about a vertical axis and tapered towards each end of the axis of rotation, the position relative to the vertical axis of the chamber at which the taper commences being in the lower half of the chamber so that the diameter of the chamber is greatest in the lower half, means for introducing the polyurethane forming ingredients and compressed air into the chamber, an openable port at the lower end of the chamber for discharging the mixed ingredients, and baffles fitted inside the chamber to assist mixing when the chamber is rotated.

A preferred embodiment of the mixing apparatus is illustrated in the accompanying drawing which represents a vertical cross-section.

The main part or barrel of the mixing chamber B is in the form of two truncated hollow cones joined at their bases at AA, at which level the chamber has its greatest diameter. The chamber may be rotated about its vertical axis with a mechanical driving means represented by C. The mixing chamber barrel is supported by the sealed bearings D in the block E which acts as a closure for the upper end of the chamber. The polyurethane ingredients and compressed air may be led into the chamber through the pipes F, F opening into the top of the chamber. Baffle blades G, G are positioned inside the mixing chamber and are fixed to a sleeve S surrounding J which can be driven or held stationary independently of J or the barrel B. The chamber is closed at the lower end by a valve in the form of a solid truncated cone H fitting above and over the port I at the bottom of the chamber. The valve is actuated by the spindle J which may be raised or lowered by means of the pneumatically operated cylinder at K.

The ingredients to be mixed are led into the sealed chamber B (which is provided with an air vent to facilitate filling—this is not shown in the drawing). The chamber is set in rotation for a suitable time, and when mixing is complete H is lifted and the contents of the chamber ejected through the port I by means of an air blast. The rotation of the mixer barrel tends to drive any residual liquid to the level AA, from which it is readily dislodged by the air blast and is removed through I. In another mode of the operation the ingredients are mixed by rotation of the baffle blades GG with the barrel B stationary or counter-rotating. On completion of mixing the baffle blades GG may optionally be stopped whilst the barrel continues to rotate and assists ejection of the mixture. When the batch is ejected the blades GG scrape the top of the cone H thus assisting in the ejection.

What we claim is:

1. Mixing apparatus suitable for mixing the ingredients used during manufacture of polyurethane foam comprising a rotatable mixing chamber that is rotatable about a vertical axis, said mixing chamber having a plurality of inlets and a closable outlet fed from the internal periphery of the chamber, at least one baffle being disposed inside said mixing chamber, said baffle being rotatable about a vertical axis independently of the mixing chamber, the lower portion of said chamber being in the shape of a truncated cone, and the outlet fed from the base of the cone.

2. A mixing apparatus suitable for mixing the ingredients used in the preparation of a polyurethane foam, said apparatus comprising a mixing chamber having the shape of two truncated cones connected end-to-end at their widest portions, said chamber having a bottom discharge opening and a closed top provided with feed openings for said ingredients, said chamber being rotatable about a vertical axis, a valve for said bottom discharge opening, said valve being disposed within said mixing chamber, and a plurality of baffles disposed in said mixing chamber above said valve, said baffles being rotatable about a vertical axis independently of the chamber and being adapted to mix the ingredients and to aid in scraping the mixing chamber and valve to discharge the mixed ingredients.

3. A mixing apparatus suitable for mixing the ingredients used in the preparation of a polyurethane foam, said apparatus comprising a mixing chamber rotatable about a vertical axis, said mixing chamber having the shape of two truncated hollow cones connected end-to-end at their widest portions and tapered towards each end of the axis of rotation, the position relative to the vertical axis of the chamber at which the tapers commence being in the lower half of the chamber so that the diameter of the chamber is greatest in the lower half, said chamber having a closed top provided with feed openings for the polyurethane forming ingredients and compressed air, and an openable port at the lower end of the chamber for discharging the mixed ingredients, a valve for closing said openable port, said valve being disposed within said mixing chamber, and a plurality of baffles disposed in said mixing chamber above said valve, said baffles being mounted on a vertical axis for rotation independently of the rotation of the mixing chamber and being adapted to improve the rate of mixing the ingredients and to scrape the mixing chamber and valve to assist discharge of the mixed ingredients.

4. The mixing apparatus of claim 3 wherein the valve is in the form of a solid truncated cone fitting above and over the openable port at the bottom of the chamber, said valve being actuated by a spindle for raising or lowering relative to the openable port.

References Cited by the Examiner

UNITED STATES PATENTS

| | | | |
|---|---|---|---|
| 1,112,213 | 9/1914 | Hult et al. | 259—34 |
| 2,347,394 | 4/1944 | Bradley | 259—3 X |
| 2,425,942 | 8/1947 | Kooman | 259—33 |
| 2,915,300 | 12/1959 | Fischer | 259—16 |
| 3,005,624 | 10/1961 | Hoppe et al. | 259—8 |
| 3,104,424 | 9/1963 | Immel | 259—151 X |

WALTER A. SCHEEL, *Primary Examiner.*

J. M. BELL, *Assistant Examiner.*